(12) United States Patent
Warner

(10) Patent No.: US 8,756,394 B1
(45) Date of Patent: Jun. 17, 2014

(54) MULTI-DIMENSION MEMORY TIMING TUNER

(75) Inventor: Thomas G. Warner, Boise, ID (US)

(73) Assignee: Marvell International Ltd., Hamilton (BM)

( * ) Notice: Subject to any disclaimer, the term of this patent is extended or adjusted under 35 U.S.C. 154(b) by 179 days.

(21) Appl. No.: 13/177,965

(22) Filed: Jul. 7, 2011

Related U.S. Application Data

(60) Provisional application No. 61/362,248, filed on Jul. 7, 2010, provisional application No. 61/446,368, filed on Feb. 24, 2011.

(51) Int. Cl.
*G06F 12/00* (2006.01)

(52) U.S. Cl.
USPC .................................. 711/167; 711/5; 710/58

(58) Field of Classification Search
USPC ......................... 710/58; 711/5, 167
See application file for complete search history.

(56) References Cited

U.S. PATENT DOCUMENTS

| | | | |
|---|---|---|---|
| 5,864,504 A | 1/1999 | Tanzawa et al. | |
| 6,016,273 A | 1/2000 | Seki et al. | |
| 6,886,120 B2 * | 4/2005 | Yamazaki | 714/721 |
| 7,075,827 B2 | 7/2006 | Aoyama et al. | |
| 7,274,611 B2 | 9/2007 | Roohparvar | |
| 7,313,019 B2 | 12/2007 | Giduturi et al. | |
| 7,411,830 B2 | 8/2008 | Takeuchi et al. | |
| 7,463,528 B2 | 12/2008 | Mokhlesi et al. | |
| 7,467,253 B2 | 12/2008 | Yero | |
| 7,542,350 B2 | 6/2009 | Park et al. | |
| 7,599,221 B2 | 10/2009 | Yamada | |
| 7,613,045 B2 | 11/2009 | Murin et al. | |
| 7,903,462 B1 | 3/2011 | Yeung et al. | |
| 7,941,590 B2 | 5/2011 | Yang et al. | |
| 8,154,919 B2 | 4/2012 | Lee et al. | |
| 8,213,228 B1 | 7/2012 | Yang | |
| 8,213,236 B1 | 7/2012 | Wu | |
| 8,611,151 B1 | 12/2013 | Yang | |
| 8,638,613 B1 | 1/2014 | Wu | |
| 2001/0003198 A1* | 6/2001 | Wu | 711/104 |
| 2008/0094897 A1 | 4/2008 | Chung et al. | |
| 2008/0175055 A1 | 7/2008 | Kim | |
| 2008/0256282 A1* | 10/2008 | Guo et al. | 710/305 |
| 2009/0273975 A1 | 11/2009 | Sarin et al. | |
| 2009/0300260 A1* | 12/2009 | Woo et al. | 710/316 |
| 2010/0027350 A1 | 2/2010 | Melik-Martirosian et al. | |

OTHER PUBLICATIONS

"Non-Final Office Action", U.S. Appl. No. 13/538,827, May 2, 2013, 6 pages.
"Non-Final Office Action", U.S. Appl. No. 13/268,183, May 7, 2013, 6 pages.
"Non-Final Office Action", U.S. Appl. No. 13/538,827, Feb. 22, 2013, 7 pages.

(Continued)

*Primary Examiner* — Gurtej Bansal

(57) ABSTRACT

In embodiments of a multi-dimension memory timing tuner, a memory device controller that can be interfaced with one or more memory devices is coupled to a memory device for data communication with the memory device via a memory bus. Control registers maintain control register values that are adjustable to tune memory bus timing margins in multi-dimensions. The memory bus timing margins are tunable for implementation of a memory device controller with one or more of the memory devices. A memory timing tuner is implemented to adjust the control register values to tune the memory bus timing margins in the multi-dimensions.

20 Claims, 8 Drawing Sheets

(56) References Cited

OTHER PUBLICATIONS

"Restriction Requirement", U.S. Appl. No. 12/610,106, (Dec. 7, 2011), 5 pages.

"Notice of Allowance", U.S. Appl. No. 12/610,106, (Feb. 29, 2012), 11 pages.

"Notice of Allowance", U.S. Appl. No. 12/762,150, (Mar. 19, 2012), 6 pages.

"Notice of Allowance", U.S. Appl. No. 13/268,183, Jul. 29, 2013, 5 pages.

"Notice of Allowance", U.S. Appl. No. 13/538,827, Sep. 17, 2013, 7 pages.

"Non-Final Office Action", U.S. Appl. No. 12/332,870, Feb. 7, 2014, 19 pages.

\* cited by examiner

MULTI-DIMENSION MEMORY TIMING TUNER

RELATED APPLICATION

This application claims priority to U.S. Provisional Patent Application Ser. No. 61/362,248 filed Jul. 7, 2010 entitled "Multi-dimensional memory timing tuner", the disclosure of which is incorporated by reference herein in its entirety. This application also claims priority to U.S. Provisional Patent Application Ser. No. 61/446,368 filed Feb. 24, 2011 entitled "Multi-dimensional memory timing tuner", the disclosure of which is incorporated by reference herein in its entirety.

BACKGROUND

The Background described in this section is included merely to present a general context of the disclosure. The Background description is not prior art to the claims in this application, and is not admitted to be prior art by inclusion in this section.

With ever-increasing memory bus speeds and tighter timing margins that must be achieved in cost-sensitive memory applications, optimal memory timing parameters can be crucial for design and implementation. Most memory controller and physical transceivers offer timing parameter adjustability to compensate for process variations (i.e., semiconductor skew), temperature ranges, board-level variations, voltage levels, and memory devices from different manufacturers. Additionally, with the trend toward SoC (system-on-chip) where a DRAM die is integrated into the chip package, the largest possible timing margin window is needed for each design to avoid yield and reliability issues. Often, simulations can only accurately account for some of these variables, and implementations may not meet expected simulation results, such as when temperature and voltage differences are encountered after products are delivered for customer implementation.

SUMMARY

This Summary introduces concepts of a multi-dimension memory timing tuner, and the concepts are further described below in the Detailed Description and/or shown in the Figures. Accordingly, this Summary should not be considered to describe essential features nor used to limit the scope of the claimed subject matter.

In one aspect, the present disclosure describes a multi-dimension memory timing tuner. A memory device controller that can be interfaced with one or more memory devices is coupled to a memory device for data communication with the memory device via a memory bus. Control registers maintain control register values that are adjustable to tune memory bus timing margins in multi-dimensions. The memory bus timing margins are tunable for implementation of a memory device controller with one or more of the memory devices. A memory timing tuner can adjust the control register values to tune the memory bus timing margins in the multi-dimensions.

A method is implemented to interface a memory device controller with a memory device via a memory bus. The memory device controller can be implemented with one or more memory devices. The method is also implemented to maintain control register values of control registers that are adjustable to tune memory bus timing margins in multi-dimensions. The memory bus timing margins are tunable for implementation of the memory device controller with one or more of the memory devices. The method is also implemented to adjust the control register values to tune the memory bus timing margins in the multi-dimensions.

A system-on-chip (SoC) includes a memory device controller that can be interfaced with one or more memory devices, and the memory device controller is coupled to a memory device for data communication via a memory bus. Control registers maintain control register values that are adjustable to tune memory bus timing margins in multi-dimensions. The memory bus timing margins are tunable for implementation of the memory device controller with one or more of the memory devices. A memory timing tuner can adjust the control register values to tune the memory bus timing margins in the multi-dimensions.

BRIEF DESCRIPTION OF THE DRAWINGS

Embodiments of a multi-dimension memory timing tuner are described with reference to the following Figures. The same numbers may be used throughout to reference like features and components that are shown in the Figures.

DETAILED DESCRIPTION

Embodiments of a multi-dimension memory timing tuner provide that a memory device can be interfaced with a memory control system, and memory bus timing for the memory device can be tuned in multi-dimensions to determine an optimal memory bus timing. Various configuration parameters can define the memory bus timing for operation with a memory device, and the adjustable parameters correlate to an N-number of dimensions that inter-relate for optimal memory bus timing. These various adjustable parameters can include read, write, control, and clock timing, as well as temperature, ASIC skew, voltage, pad driver strength, clock dither, and memory device parameters from different manufacturers. A memory control system includes control registers that maintain control register values, which correlate to the various configuration parameters, and are adjustable to tune memory bus timing for a particular memory device, or set of memory devices.

While features and concepts of a multi-dimension memory timing tuner can be implemented in any number of different devices, systems, environments, and/or configurations, embodiments of a multi-dimension memory timing tuner are described in the context of the following example devices, systems, and methods.

Figure 1:
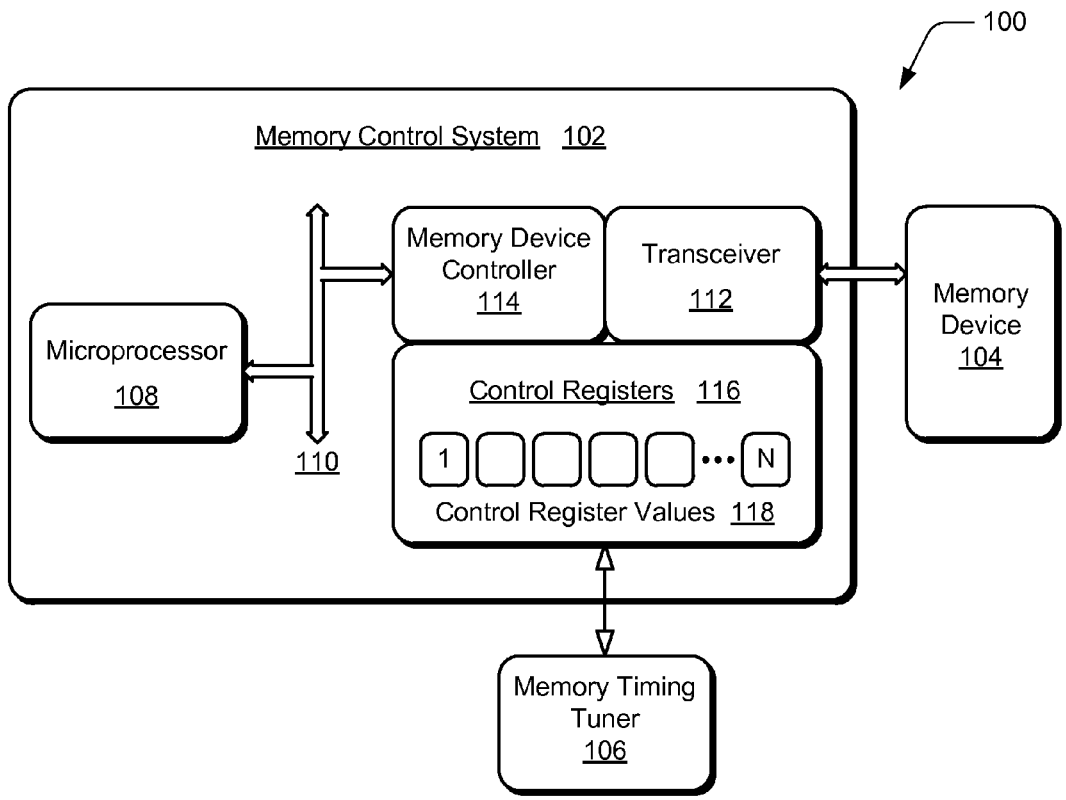
FIG. 1 illustrates an example of a memory control system in which embodiments of a multi-dimension memory timing tuner can be implemented.

FIG. 1 illustrates an example 100 of a memory control system 102 that is implemented to interface with a memory device 104, and in which embodiments of a multi-dimension memory timing tuner 106 can be implemented. In this example, the memory control system 102 includes a microprocessor 108, a system bus 110 for data communication, and a transceiver 112 via which a memory device controller 114 interfaces with the memory device. In implementations, the memory device 104 may be implemented as a Synchronous DRAM (SDRAM) or as a DDR (double data rate) memory device, the transceiver 112 is a DDR physical transceiver, and the memory device controller 114 is a SDRAM or DDR controller. The memory control system 102 also includes control registers 116 that maintain control register values 118, which are adjustable to tune memory bus timing margins in multi-dimensions. In implementations, a number of the multi-dimensions corresponds to the number of control registers.

The memory device controller 114 can interface with different types of memory devices, and the control register values are adjustable to tune memory bus timing margins for implementation with one or more of the memory devices. The control registers are designed into the memory control system for flexibility so that the system can be implemented in various, different applications with a wide range of memory devices. The memory timing tuner 106 is implemented to determine multiple sets of the control register values, where each set of the control register values corresponds to optimal memory bus timing margins for implementation with one or more of the memory devices, and the number of control register value sets can be equal to or fewer than a number of the one or more memory devices. For example, the memory timing tuner can tune the memory bus timing margins for a first optimal timing with a first memory device, and also tune the memory bus timing margins for a second optimal timing with a second memory device. The memory timing tuner can then average the first and second optimal timings for implementation of the memory device controller with either of the memory devices.

In various embodiments, the memory timing tuner 106 can be implemented as a software application (e.g., an algorithm implemented as computer-executable instructions), in firmware, or as hardware. These implementations are described further with reference to FIGS. 4 and 5. Although shown as independent components, the memory control system 102 may be implemented to include the memory timing tuner 106 and/or the memory device 104. Alternatively or in addition, the components may all be implemented as a system-on-chip (SoC) in a computing device, such as described with reference to the example SoC shown in FIG. 6.

Figure 2:
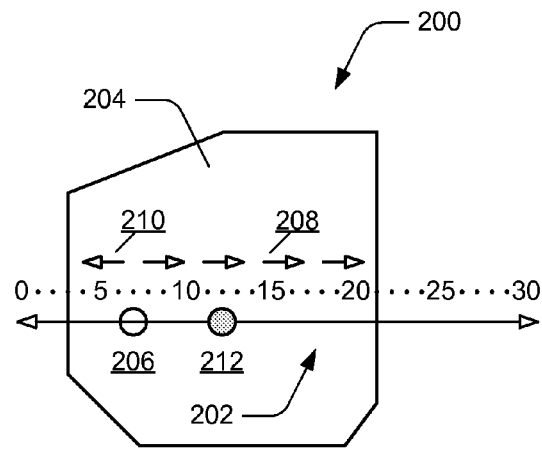
FIG. 2 illustrates an example of tuning memory timing in one dimension in accordance with one or more embodiments.

FIG. 2 illustrates an example 200 of tuning memory timing in one dimension 202. A representation of a memory passing region 204 is illustrated, and the memory timing of the dimension is tuned to center the memory bus timing in the memory passing region. In this example, an initial starting point 206 is selected at approximately seven (7) taps (also referred to herein as increments, or memory taps of adjustment). The memory taps are then adjusted in a positive direction 208 of the dimension until a timing fail in the positive direction is determined, which is at approximately twenty-one (21) taps in this example. From the initial starting point 206 at approximately seven (7) taps, the memory taps are then adjusted in a negative direction 210 of the dimension until a timing fail in the negative direction is determined, which is at approximately three (3) taps in this example. A center point 212 along the dimension at approximately twelve (12) taps can then be determined from the timing fails in the positive and negative directions, and the center point and timing margins represent an optimal memory bus timing of the dimension for the memory device.

In this example, the center point 212 of the dimension in the memory passing region is calculated as: 3+((21−3)/2)=12 taps. Before tuning the memory bus timing in the one dimension 202, the worst case margin to a timing fail was four (4), based on the initial starting point 206 at approximately seven taps to the nearest timing fail at three taps (i.e., 7−3=4). After tuning the memory bus timing of the dimension, the worst case margin to a timing fail is nine (9), based on the determined center point 212 at approximately twelve taps to a nearest timing fail at three taps (i.e., 12−3=9). The timing margins for the nearest timing fail has been improved by five (5) memory taps.

In embodiments, this example 200 of tuning memory timing in the one dimension 202 can be applied for consecutive, multi-dimensions to determine the timing margins and to tune the memory bus timing for an implementation of a memory control system with a memory device. For example, the memory timing tuner 106 described with reference to FIG. 1 is implemented to tune the memory bus timing for each consecutive dimension after determining the center point 212 of the first dimension. For each consecutive dimension after the first dimension, the memory timing tuner 106 is implemented to adjust the consecutive dimension in a positive direction of the dimension from the center point of a previous dimension until a positive direction timing fail is determined. The memory timing tuner then adjusts the consecutive dimension in a negative direction of the dimension from the center point of the previous dimension until a negative direction timing fail is determined. A center point between the positive direction timing fail and the negative direction timing fail is then determined as the optimal memory bus timing of the dimension.

Figure 3:
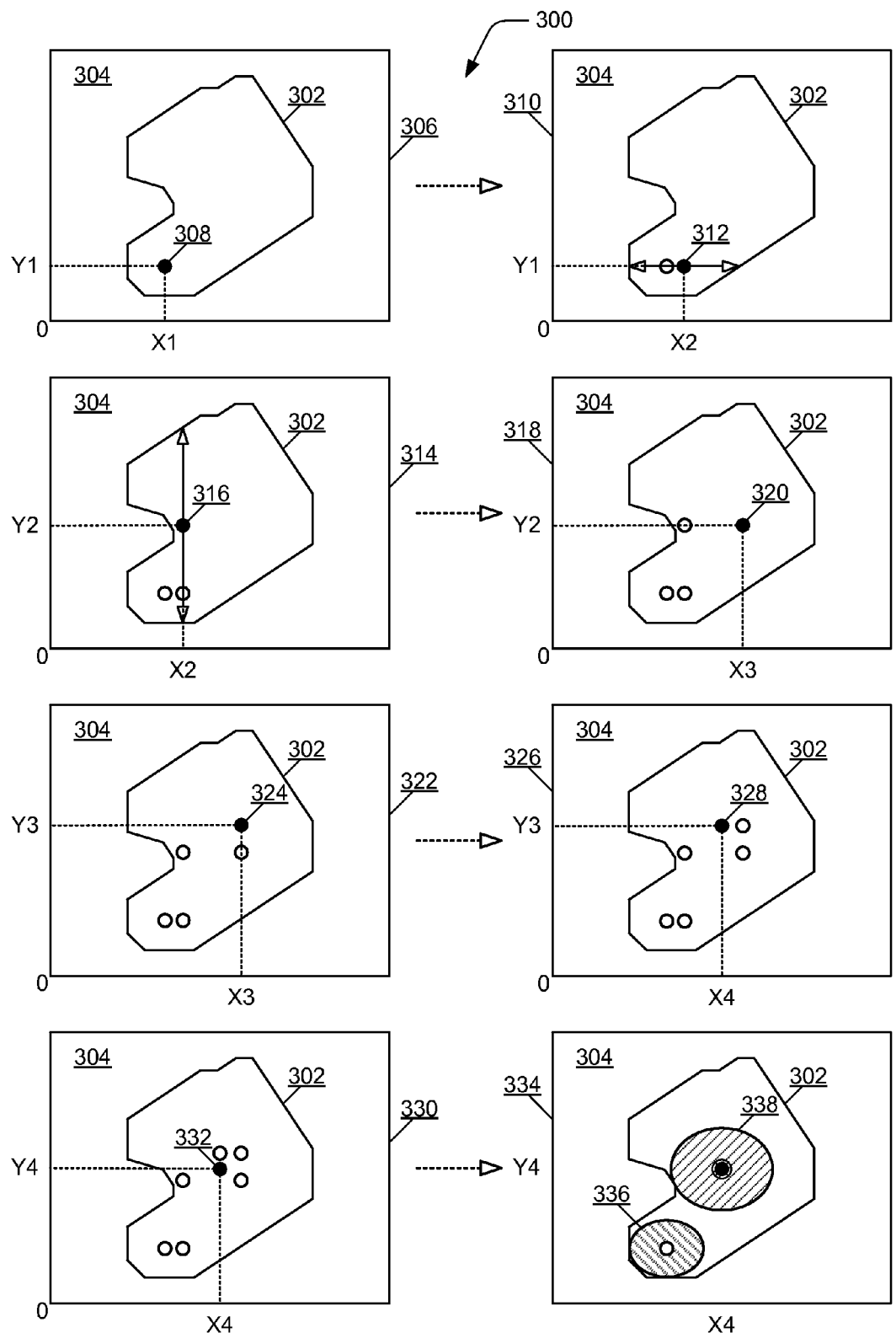
FIG. 3 illustrates an example of tuning memory timing in two dimensions in accordance with one or more embodiments.

FIG. 3 illustrates an example 300 of tuning memory bus timing in two dimensions (e.g., as an example of tuning memory timing in multi-dimensions), and is implemented by the memory timing tuner described with reference to FIG. 1. Although this example only illustrates tuning memory bus timing in the two dimensions (e.g., an x-axis and a y-axis), the method of determining memory bus timing can be applied generally as a nested loop for each consecutive dimension in embodiments of multi-dimension memory timing tuner. In this example 300, the x-axis may be a dimension that corresponds to a read timing parameter and the y-axis may be a dimension that corresponds to clock timing.

As described above, additional dimensions may correspond to parameters for temperature, ASIC skew, voltage, parameters for read, write, and clock timing, and/or other parameters that define a range of operation for a memory device or memory devices from different manufacturers. For example, three dimensions may be represented as a spherical volume around a determined center point in a memory passing region within the sphere.

In the example 300, a memory device has a memory passing region 302 represented by the bounded region within a memory bus timing failure region 304. Initially at 306, a starting point 308 at [x1,y1] is selected or determined for a first dimension (i.e., the horizontal dimension in this example). The starting point can correspond to a selected passing memory bus timing, such as based on at least a minimum standard of memory bus timing for given design constraints as indicated by a manufacturer of the memory device. At 310, a center point 312 of the first dimension is determined at [x2,y1], such as described with reference to the example shown in FIG. 2.

At 314, a center point 316 of a second dimension (i.e., the vertical dimension in this example) is determined at [x2,y2]. At 318, the first dimension is re-centered to determine the center point 320 at [x3,y2]. At 322, the second dimension is re-centered to determine the center point 324 at [x3,y3]. At 326, the first dimension is again re-centered to determine the center point 328 at [x4,y3]. Note that the distance from one determined center point to the next generally decreases as the memory timing tuner is applied to determine the optimal memory bus timing for the memory device as an approximate center of the memory passing region 302. At 330, the second dimension is again re-centered to determine the center point 332 at [x4,y4] as the approximate center of the memory passing region 302.

A factor of the memory timing tuner determining the approximate center of the memory passing region is the distance between successively determined center points. If a large tolerance setting between the center points is used, then the memory timing tuner will process quickly, but may not find the best center point. If too tight of a tolerance setting is used, then the memory timing tuner may oscillate between successive points. The memory timing tuner can be implemented to re-center the axis of each dimension consecutively until the center point of the memory passing region is within a minimal change range, such as a minimum distance from the previous dimension center point.

At 334, a smaller timing margin 336 that is associated with the initial starting point 308 is shown centered around the initial starting point. A larger, improved timing margin 338 that is associated with the determined center point of the memory passing region is shown centered around the last determined center point 332.

Figure 4:
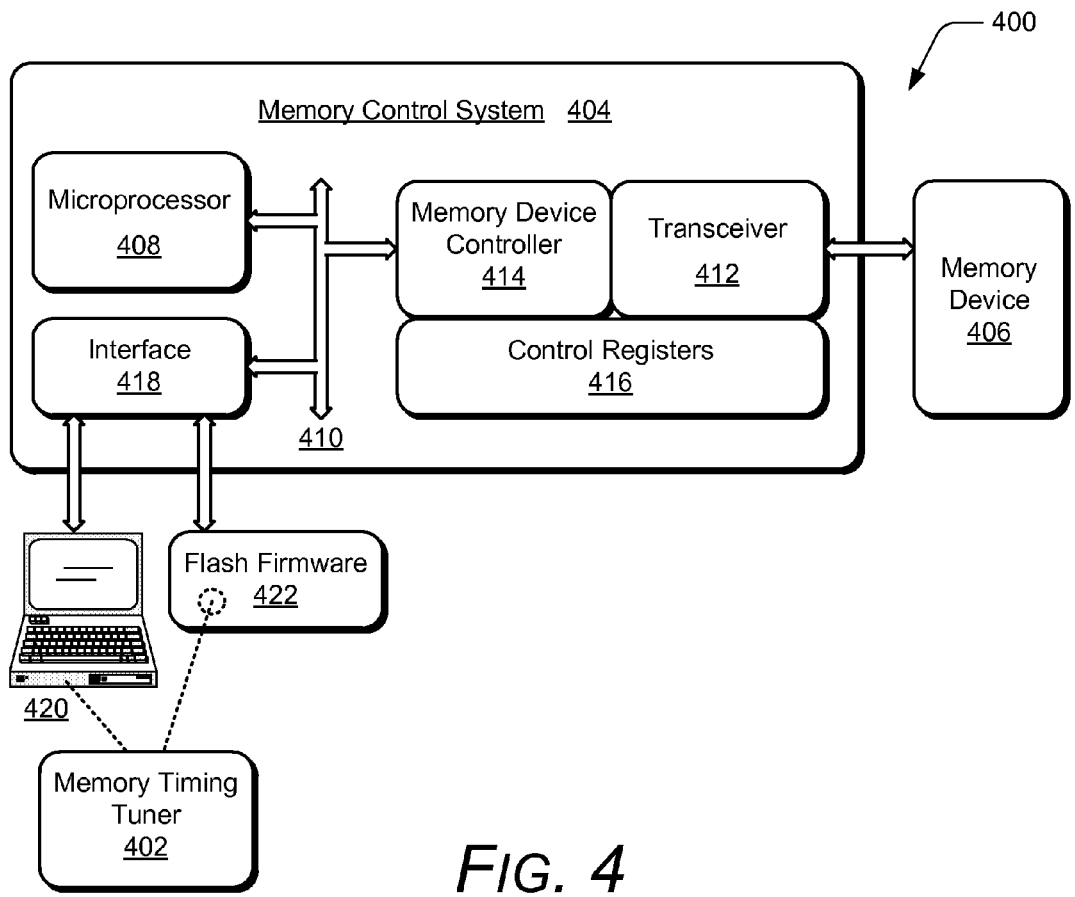
FIG. 4 illustrates example implementations of a multi-dimension memory timing tuner in accordance with one or more embodiments.

FIG. 4 illustrates example implementations 400 of a multi-dimension memory timing tuner 402. Similar to the example described with reference to FIG. 1, a memory control system 404 is implemented to interface with a memory device 406. The memory control system 404 includes a microprocessor 408, a system bus 410 for data communication, and a transceiver 412 via which a memory device controller 414 interfaces with the memory device. The memory control system 404 also includes control registers 416 that maintain control register values, which are adjustable to tune memory bus timing margins in multi-dimensions. In this example, the memory control system also includes an interface 418, which may be implemented to interface with a computing device 420 that implements the memory timing tuner 402 as software. Alternatively, the interface may be implemented as a flash interface for flash firmware 422 that implements the memory timing tuner 402 in firmware.

The computing device 420 can be utilized as a host test machine that implements the memory timing tuner 402 in software. The test machine provides the memory control system 404 with the iterative control register values that are maintained by the control registers 416 when determined by the memory timing tuner. Initially, the control register values can be communicated via the interface 418, and then the memory timing tuner executed by the computing device can determine the optimal memory bus timing margins for the memory device 406 in multi-dimensions as described with reference to FIG. 3.

Iteratively, the memory timing tuner 402 determines a center point of a dimension within the memory passing region of the memory device 406, the test machine reviews the result, initiates a corresponding change to the control register values, and the new control register values are communicated to the memory control system via the interface. This can be repeated for each consecutive dimension to tune the multi-dimension memory bus timing. In this implementation, the test machine (e.g., the computing device) manages the memory timing tuner and the memory control system accepts the control parameters, runs a pass or fail memory bus timing test, and then reports the result back to the test machine via the interface.

In an alternate implementation, the memory timing tuner 402 can be implemented in ATE (Automated Tester Equipment). The automated tester replaces the computing device 420 as described in the above example, such as for SIP (System in Package) devices, where the memory device (e.g., DDR die) is included within the memory control system as an integrated package.

In the firmware implementation of the memory timing tuner 402, an embedded system contains the memory timing tuner within a non-volatile device, such as a SPI Flash, and executes tuning the multi-dimension memory timing to determine the optimal memory bus timing margins for the memory device 406 in multi-dimensions as described with reference to FIG. 3. In this implementation, the memory timing tuner can be executed during system development, during product assembly, or in the final product after distribution.

Similar to the software implementation of the memory timing tuner 402, initial control register values are stored in non-volatile memory (e.g., EEPROM or Flash), and then the memory timing tuner is executed from the flash firmware 422 and controlled via the microprocessor 408. Iteratively, the memory timing tuner determines a center point of a dimension within the memory passing region of the memory device 406, the flash firmware reviews the result, initiates a corresponding change to the control register values, and the new control register values are communicated to the memory control system via the interface. This can be repeated for each consecutive dimension to tune the multi-dimension memory bus timing.

Figure 5:
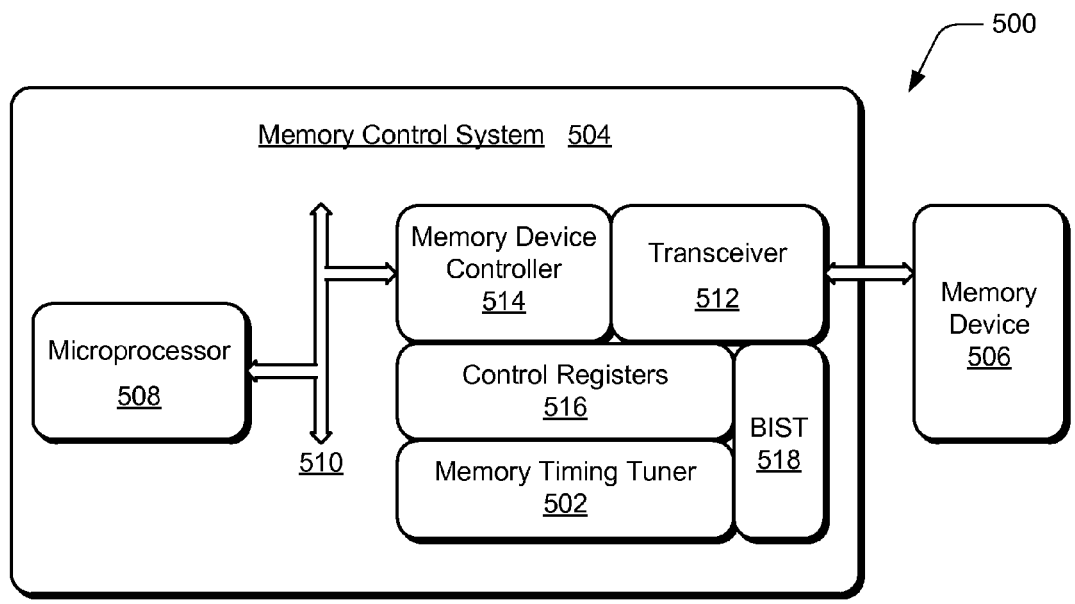
FIG. 5 illustrates another example implementation of a multi-dimension memory timing tuner in accordance with one or more embodiments.

FIG. 5 illustrates another example implementation 500 of a multi-dimension memory timing tuner 502 implemented as a state machine and associated logic in hardware. Similar to the example described with reference to FIG. 1, a memory control system 504 is implemented to interface with a memory device 506. The memory control system 504 includes a microprocessor 508, a memory bus 510 for data communication, and a transceiver 512 via which a memory device controller 514 interfaces with the memory device. The memory control system 504 also includes control registers 516 that maintain control register values, which are adjustable to tune memory bus timing margins in multi-dimensions. In this hardware example, the memory control system also includes the memory timing tuner 502 and a built-in self test (BIST) module 518. For example, the state machine and associated logic of the memory timing tuner 502, as well as the built-in self test module 518, can be integrated into the silicon as part of a chip design.

A hardware implementation of the memory timing tuner 502 can be utilized from early development within initial silicon through client calibration at any time after product distribution. For example, a calibration tuning of multi-dimension memory timing can be initiated when the system is idle or in a sleep mode as a non-intrusive technique to maintain timing margin throughout the useful life of the product. The adjustable memory timing parameters may include read, write, and control timing, clock delays, pad driver strength, clock dither, memory device size and address range, and different test modes. Further, built-in self test patterns can include Walking 1's, 257-Test, Column March, Incrementing Pattern, etc. The memory timing tuner 502 can be initiated to tune the multi-dimensions for memory bus timing by starting the built-in self test module 518, and then storing the determined center point results for the multi-dimensions as the control register values. This hardware implementation is fast-executing and can be scaled to run concurrently on many systems because it is self-contained within the silicon.

Figure 6:
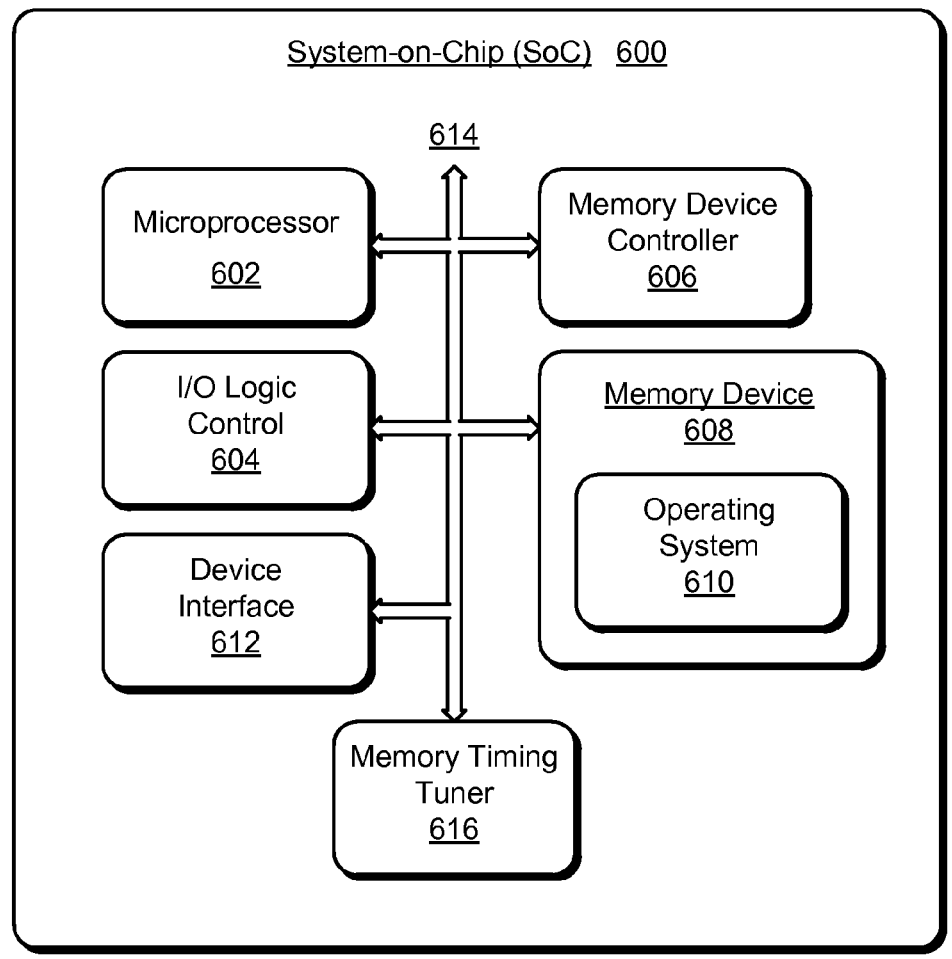
FIG. 6 illustrates an example system-on-chip (SoC) in which embodiments of a multi-dimension memory timing tuner can be implemented.

FIG. 6 illustrates an example system-on-chip (SoC) 600, which can implement various embodiments of a multi-dimension memory timing tuner as described herein. The SoC may be implemented in a fixed or mobile device, such as any one or combination of a consumer, electronic, communication, navigation, media, and/or computing device, as well as in a vehicle that implements a navigation system. The SoC 600 can be integrated with electronic circuitry, a microprocessor, memory, input-output (I/O) logic control, communication interfaces and components, as well as other hardware, firmware, and/or software to implement a multi-dimension memory timing tuner.

In this example, the SoC 600 is integrated with a microprocessor 602 (e.g., any of a microcontroller or digital signal processor) and input-output (I/O) logic control 604 (e.g., to include electronic circuitry). The SoC 600 also includes a memory device controller 606 and a memory device 608, such as any type of a nonvolatile memory and/or other suitable electronic data storage device. The memory device controller 606 is representative of any of the memory control systems described with reference to previous FIGS. 1-5. The SoC can also include various firmware and/or software, such as an operating system 610 that is maintained by the memory and executed by the microprocessor.

The SoC 600 includes a device interface 612 to interface with a device or other peripheral component, such as when installed in any of the navigation, communication, and/or computer devices described herein. The SoC 600 also includes an integrated data bus 614 that couples the various components of the SoC for data communication between the components. The data bus in the SoC may also be implemented as any one or a combination of different bus structures and/or bus architectures.

In embodiments of a multi-dimension memory timing tuner, the SoC 600 includes a memory timing tuner 616 that can be implemented as computer-executable instructions maintained by the memory device 608 and executed by the microprocessor 602. Alternatively, the memory timing tuner 616 can be implemented as hardware, in firmware, fixed logic circuitry, or any combination thereof that is implemented in connection with the I/O logic control 604 and/or other processing and control circuits of the SoC. Examples of the memory timing tuner, as well as corresponding functionality and features, are described with reference to the respective components shown in FIGS. 1-5.

Example methods 700, 800, and 900 are described with reference to respective FIGS. 7, 8, and 9 in accordance with one or more embodiments of a multi-dimension memory timing tuner. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example method(s) may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 7:
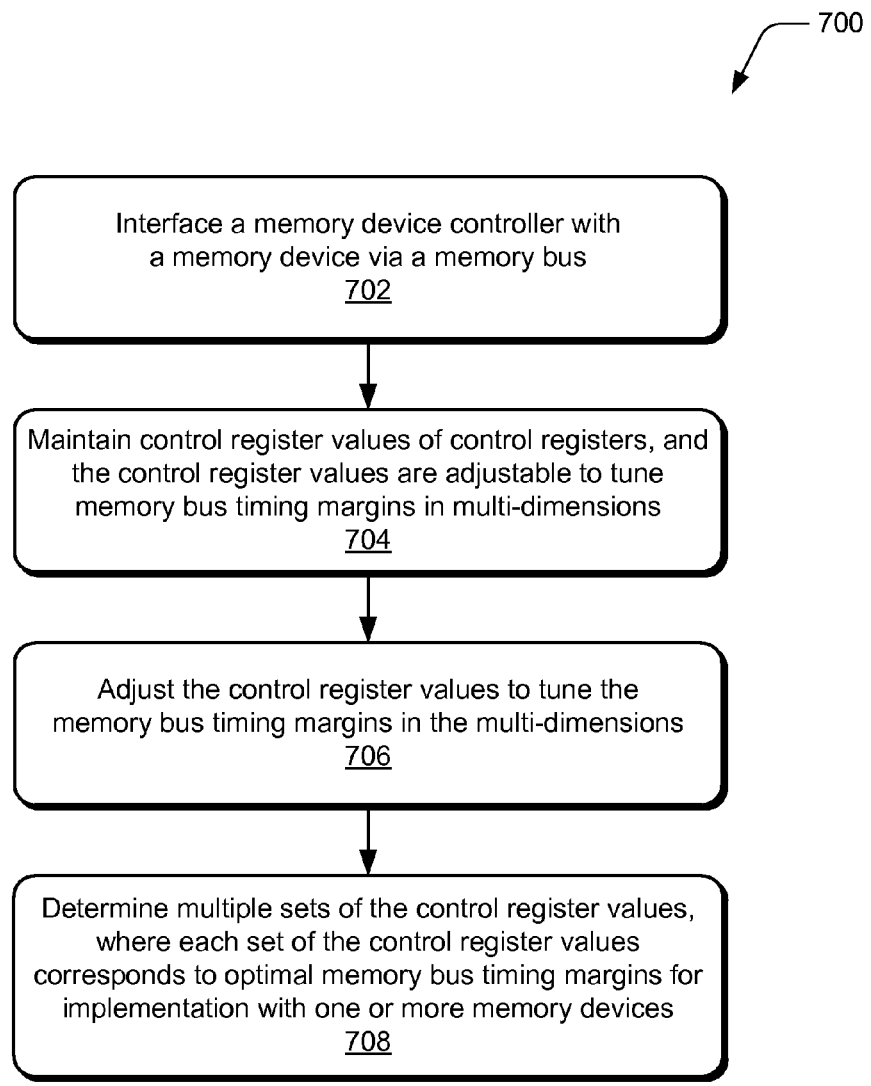
FIG. 7 illustrates example methods of multi-dimension memory timing tuning in accordance with one or more embodiments.

FIG. 7 illustrates example method(s) 700 of a multi-dimension memory timing tuner. The order in which the method is described is not intended to be construed as a limitation, and any number of the described method blocks can be combined in any order to implement the method, or an alternate method.

At block 702, a memory device controller interfaces a memory device via a memory bus. For example, the memory device controller 114 of the memory control system 102 (FIG. 1) interfaces with the memory device 104, the memory device controller 414 of the memory control system 404 (FIG. 4) interfaces with the memory device 406, and the memory device controller 514 of the memory control system 504 (FIG. 5) interfaces with the memory device 506. In these example memory control systems, the memory device controllers are configured for implementation with various, different memory devices.

At block 704, control register values of control registers are maintained and are adjustable to tune memory bus timing margins in multi-dimensions. For example, the control registers 116 of the memory control system 102 maintain control register values 118, which are adjustable to tune memory bus timing margins in multi-dimensions. In implementations, the memory bus timing margins are tunable for implementation with one or more memory devices, and a number of the multi-dimensions corresponds to the number of the control registers.

At block 706, the control register values are adjusted to tune the memory bus timing margins in the multi-dimensions. For example, the memory timing tuner 106 tunes the memory bus timing margins in the multi-dimensions for the memory device 104, and initiates adjusting the control register values accordingly for optimal memory bus timing to interface the memory device controller 114 with the memory device 104.

At block 708, multiple sets of the control register values are determined, where each set of the control register values corresponds to optimal memory bus timing margins for implementation with one or more of the memory devices. For example, the control registers 116 are designed into the memory control system 102 for flexibility so that the system can be implemented in various, different applications with a wide range of memory devices. The memory timing tuner 106 determines multiple sets of the control register values 118, where each set of the control register values corresponds to optimal memory bus timing margins for implementation with one or more of the memory devices, and the number of control register value sets can be equal to or fewer than a number of the one or more memory devices.

Figure 8:
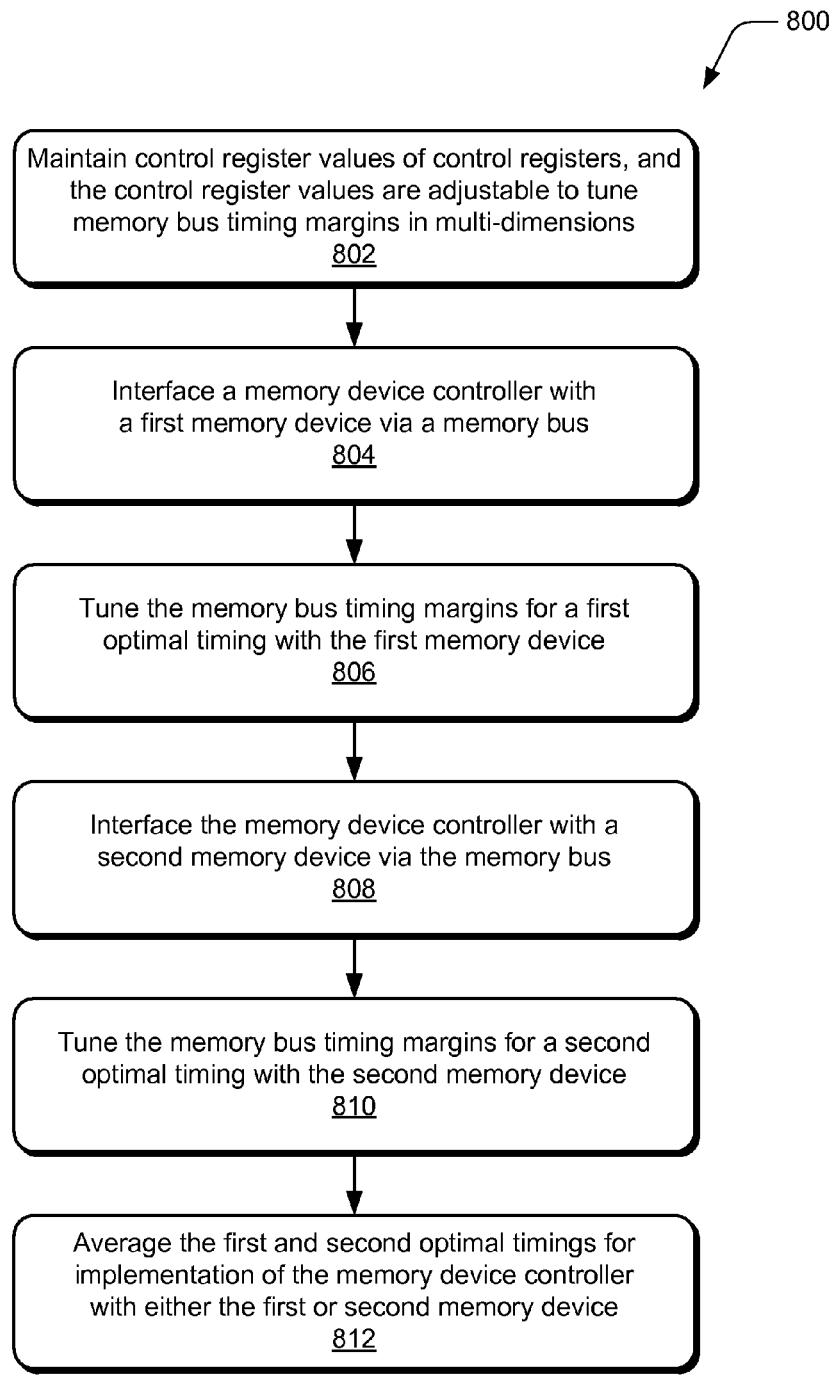
FIG. 8 illustrates example methods of multi-dimension memory timing tuning in accordance with one or more embodiments.

FIG. 8 illustrates example method(s) 800 of a multi-dimension memory timing tuner. The order in which the method is described is not intended to be construed as a limitation, and any number of the described method blocks can be combined in any order to implement the method, or an alternate method.

At block 802, control register values of control registers are maintained and are adjustable to tune memory bus timing margins in multi-dimensions. For example, the control registers 116 of the memory control system 102 (FIG. 1) maintain control register values 118, which are adjustable to tune memory bus timing margins in multi-dimensions. In implementations, the memory bus timing margins are tunable for implementation with one or more memory devices, and a number of the multi-dimensions corresponds to the number of the control registers.

At block 804, a memory device controller interfaces a first memory device via a memory bus and, at block 806, the memory bus timing margins are tuned for a first optimal timing with the first memory device. For example, the memory device controller 114 of the memory control system 102 interfaces with the memory device 104, and memory timing tuner 106 tunes the memory bus timing margins for a first optimal timing with the first memory device.

At block 808, the memory device controller interfaces a second memory device via the memory bus and, at block 810, the memory bus timing margins are tuned for a second optimal timing with the second memory device. For example, the memory device controller 114 of the memory control system 102 interfaces with a different memory device, and memory timing tuner 106 tunes the memory bus timing margins for a second optimal timing with the memory device.

At block 812, the first and second optimal timings are averaged for implementation of the memory device controller with either the first memory device or the second memory device. For example, the memory timing tuner 106 averages the first and second optimal timings for implementation of the memory device controller 114 with either of the first or second memory devices in a memory control system.

Figure 9:
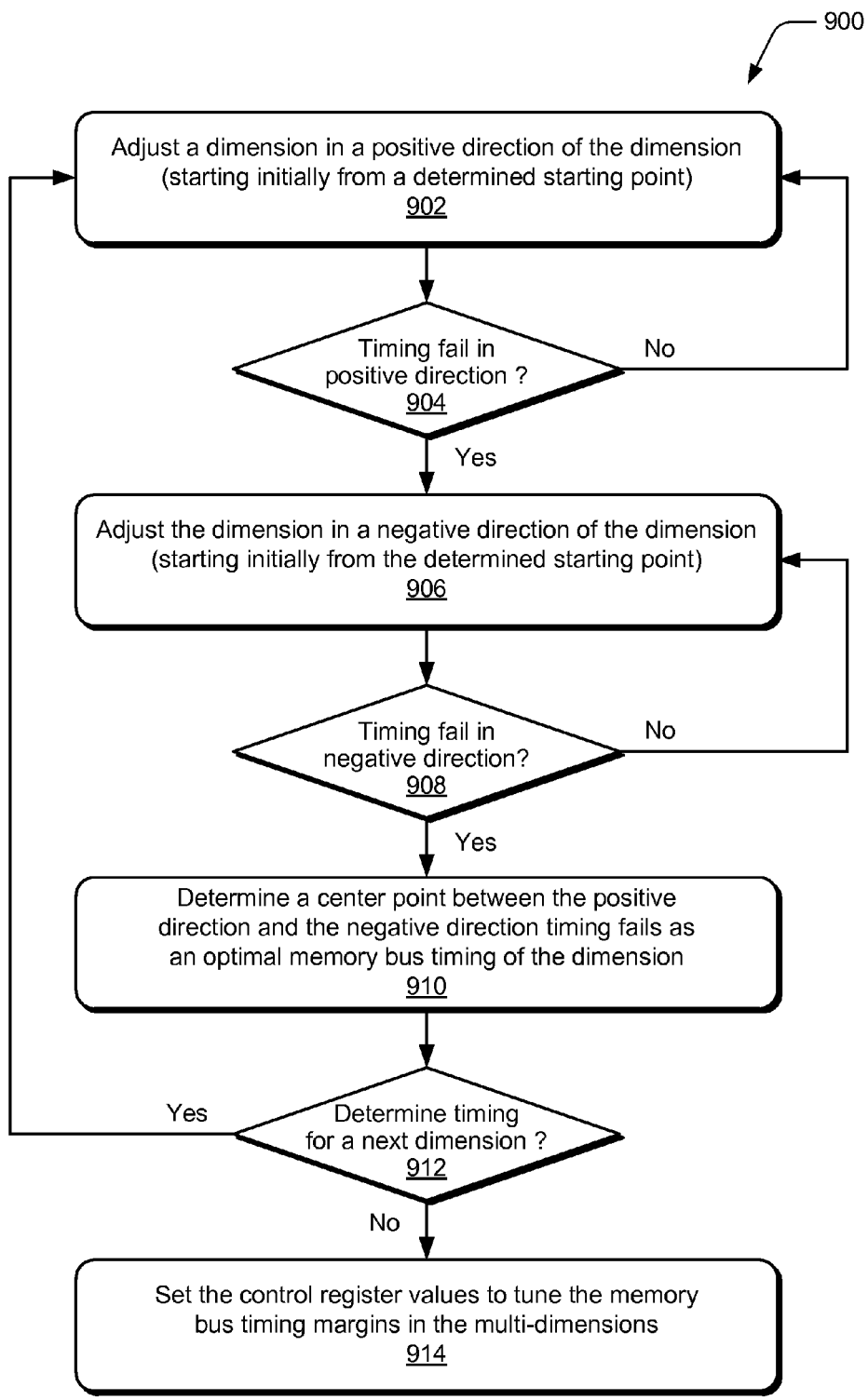
FIG. 9 illustrates example methods of multi-dimension memory timing tuning in accordance with one or more embodiments.

FIG. 9 illustrates example method(s) 900 of a multi-dimension memory timing tuner. The order in which the method is described is not intended to be construed as a limitation, and any number of the described method blocks can be combined in any order to implement the method, or an alternate method.

At block 902, a dimension is adjusted in a positive direction of the dimension starting from a determined starting point. As described with reference to the example of tuning memory bus timing in multi-dimensions shown in FIG. 3, a memory device has a memory passing region 302 represented by the bounded region within a memory bus timing failure region 304. Initially at 306, a starting point 308 is selected or determined for the first dimension. The starting point can correspond to a selected passing memory bus timing, such as based on at least a minimum standard of memory bus timing for given design constraints as indicated by a manufacturer of the memory device. For each consecutive dimension, the determined starting point corresponds to a determined center point of the timing margins for a previous dimension.

At block 904, a determination is made as to whether the positive adjustment results in a positive direction timing fail. For example, the dimension is incrementally adjusted in the positive direction until a positive direction timing fail is detected. If the positive adjustment of the dimension does not result in a timing fail (i.e., "no" from block 904), then the dimension is again adjusted in the positive direction at block 902. If the positive adjustment of the dimension does result in a timing fail (i.e., "yes" from block 904), then at block 906, the dimension is adjusted in a negative direction of the dimension starting from the determined starting point.

At block 908, a determination is made as to whether the negative adjustment results in a negative direction timing fail. For example, the dimension is incrementally adjusted in the negative direction until a negative direction timing fail is detected. If the negative adjustment of the dimension does not result in a timing fail (i.e., "no" from block 908), then the dimension is again adjusted in the negative direction at block 906. If the negative adjustment of the dimension does result in a timing fail (i.e., "yes" from block 908), then at block 910, a center point between the positive direction timing fail and the negative direction timing fail is determined as an optimal memory bus timing of the dimension.

At block 912, a determination is made as to whether the timing margins for a next, consecutive dimension are to be determined. For example, the timing margins for a next, consecutive dimension may be determined, or the center points determined for previous dimensions may again be re-centered for a dimension. If the timing margins for a consecutive dimension are to be determined, or re-centered (i.e., "yes" from block 912), then the method continues at block 902 through 910 to determine the timing margins for the next dimension. If there are no additional dimensions, or if the last determined center point of a dimension is within a minimal change range, such as within a minimum distance from the previous dimension center point (i.e., "no" from block 912), then at block 914, the control register values are set to tune the memory bus timing margins in the multi-dimensions.

Figure 10:
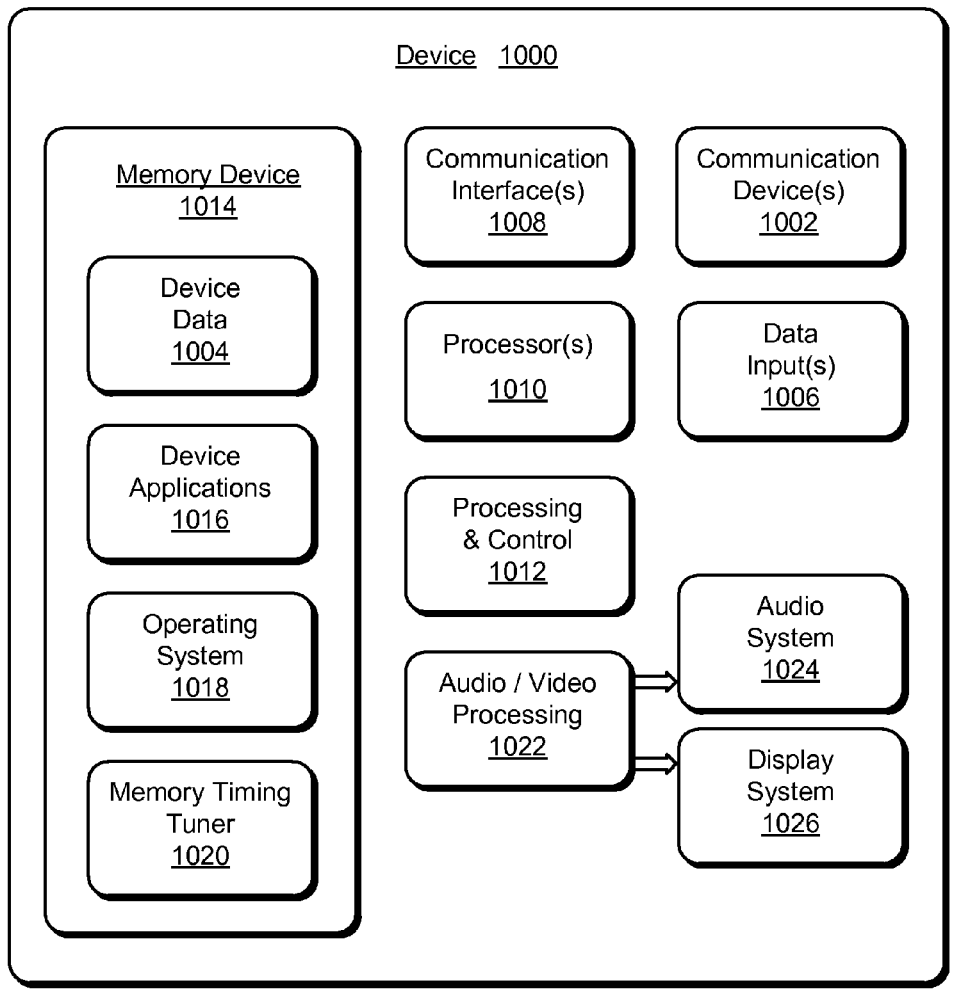
FIG. 10 illustrates various components of an example device that can implement embodiments of a multi-dimension memory timing tuner.

FIG. 10 illustrates various components of an example device 1000 that can be implemented as any of the devices, or services implemented by devices, described with reference to the previous FIGS. 1-9. The device may also be implemented to include the example system-on-chip (SoC) described with reference to FIG. 6. In embodiments, the device may be implemented as any one or combination of a fixed or mobile device, in any form of a consumer, computer, server, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 1000 includes communication devices 1002 that enable wired and/or wireless communication of device data 1004, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 1006 via which any type of data, media content, and/or inputs can be received, such as user-selectable inputs and any other type of audio, video, and/or image data received from any content and/or data source.

The device 1000 also includes communication interfaces 1008, such as any one or more of a serial, parallel, network, or wireless interface. The communication interfaces provide a connection and/or communication links between the device and a communication network by which other electronic, computing, and communication devices communicate data with the device.

The device 1000 includes one or more processors 1010 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 1012. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 1000 also includes one or more memory devices 1014 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

A memory device 1014 provides data storage mechanisms to store the device data 1004, other types of information and/or data, and various device applications 1016. For example, an operating system 1018 can be maintained as a software application with a memory device and executed by the processors. The device applications may also include a device manager, such as any form of a control application, software application, signal processing and control module, code that is native to a particular device, a hardware abstraction layer for a particular device, and so on. In this example, the device applications 1016 include a memory timing tuner 1020 to implement tuning multi-dimension memory timing. The memory timing tuner is shown as software and/or a computer application. Alternatively or in addition, the memory timing tuner can be implemented as hardware, software, firmware, fixed logic, or any combination thereof.

The device 1000 also includes an audio and/or video processing system 1022 that generates audio data for an audio system 1024 and/or generates display data for a display system 1026. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of a multi-dimension memory timing tuner have been described in language specific to features and/or methods, the subject of the appended claims is not necessarily limited to the specific features or methods described. Rather the specific features and methods are disclosed as example implementations of a multi-dimension memory timing tuner.

The invention claimed is:

1. A memory control system, comprising:
a memory device controller configured to interface with one or more memory devices, wherein the memory device controller is coupled to one or more of the memory devices and configured for data communication with the one or more memory devices via a memory bus;
control registers configured to maintain control register values that are adjustable to tune memory bus timing margins in multi-dimensions, wherein the memory bus timing margins are tunable for implementation with the one or more memory devices; and
a memory timing tuner configured to adjust the control register values to tune the memory bus timing margins in the multi-dimensions, the adjust at least comprising:
adjust, for a first dimension of the multi-dimensions, the memory bus timing margin in a positive direction of the first dimension from an initial starting point until a first timing fail is determined, the initial starting point corresponding to a passing memory bus timing;
adjust, for the first dimension of the multi-dimensions, the memory bus timing margin in a negative direction of the first dimension from the initial starting point until a second timing fail is determined; and
determine, for the first dimension of the multi-dimensions, a center point between the first and second timing fails as an optimal memory bus timing of the first dimension.

2. The memory control system as recited in claim 1, wherein a number of the multi-dimensions corresponds to the number of the control registers.

3. The memory control system as recited in claim 1, wherein the memory timing tuner is further configured to determine multiple sets of the control register values equal to or fewer than a number of the one or more memory devices.

4. The memory control system as recited in claim 1, wherein the memory timing tuner is configured to determine the optimal memory bus timing of the first dimension for a first of the one or more memory devices and is further configured to:
tune the memory bus timing margins for a second optimal memory bus timing with a second memory device; and
average the first and second optimal memory bus timings for said implementation of the memory device controller with either the first memory device or the second memory device.

5. The memory control system as recited in claim 1, wherein for a second dimension of the multi-dimensions after the first dimension, the memory timing tuner is further configured to:
adjust the memory bus timing margin in a positive direction of the second dimension from the center point of the first dimension until a positive direction timing fail is determined;
adjust the memory bus timing margin in a negative direction of the second dimension from the center point of the first dimension until a negative direction timing fail is determined; and
determine a center point between the positive direction timing fail and the negative direction timing fail as an optimal memory bus timing of the second dimension.

6. The memory control system as recited in claim 1, further comprising a processor configured to execute the memory timing tuner.

7. The memory control system as recited in claim 1, wherein the memory timing tuner is configured as at least one of a software application, in firmware, or as hardware.

8. The memory control system as recited in claim 1, wherein at least one of the multi-dimensions corresponds to a parameter for a temperature, ASIC skew, voltage, read time, write time, or clock time.

9. A method, comprising:
interfacing a memory device controller with a memory device via a memory bus, wherein the memory device controller is configured for implementation with one or more memory devices;
maintaining control register values of control registers that are adjustable to tune memory bus timing margins in multi-dimensions, the memory bus timing margins tunable for implementation of the memory device controller with one or more of the memory devices; and adjusting the control register values to tune the memory bus timing margins in the multi-dimensions, the adjusting comprising:
  adjusting the memory bus timing margin in a positive direction of a first dimension from an initial starting point until a first timing fail is determined, the initial starting point corresponding to a passing memory bus timing;
  adjusting the memory bus timing margin in a negative direction of the first dimension from the initial starting point until a second timing fail is determined; and
  determining a center point between the first and second timing fails as an optimal memory bus timing of the first dimension.

10. The method as recited in claim 9, wherein a number of the multi-dimensions corresponds to the number of the control registers.

11. The method as recited in claim 9, further comprising determining multiple sets of the control register values equal to or fewer than a number of the one or more memory devices.

12. The method as recited in claim 9, wherein determining the optimal memory bus time of the first dimension is for a first of the one or more memory devices and further comprising:
  tuning the memory bus timing margins for a second optimal memory bus timing with a second memory device; and
  averaging the first and second optimal memory bus timings for said implementation of the memory device controller with either the first memory device or the second memory device.

13. The method as recited in claim 9, further comprising, for a second dimension after the first dimension:
  adjusting the memory bus timing margin in a positive direction of the second dimension from the center point of the first dimension until a positive direction timing fail in the positive direction is determined;
  adjusting the memory bus timing margin in a negative direction of the second dimension from the center point of the first dimension until a negative direction timing fail is determined; and
  determining a center point between the positive direction timing fail and the negative direction timing fail as an optimal memory bus timing of the second dimension.

14. The method as recited in claim 9, wherein at least one of the multi-dimensions corresponds to a parameter for a temperature, ASIC skew, voltage, read time, write time, or clock time.

15. A system-on-chip, comprising:
  a memory device controller configured to interface with one or more memory devices, wherein the memory device controller is coupled to one or more of the memory devices and configured for data communication with the one or more memory devices via a memory bus;
  control registers configured to maintain control register values that are adjustable to tune memory bus timing margins in multi-dimensions, the memory bus timing margins tunable for implementation with the one or more memory devices; and
  a memory timing tuner configured to adjust the control register values to tune the memory bus timing margins in the multi-dimensions, the adjust at least comprising:
    adjust, for a first dimension of the multi-dimensions, the memory bus timing margin in a positive direction of the first dimension from an initial starting point until a first timing fail is determined, the initial starting point corresponding to a passing memory bus timing;
    adjust, for the first dimension of the multi-dimensions, the memory bus timing margin in a negative direction of the first dimension from the initial starting point until a second timing fail is determined; and
    determine, for the first dimension of the multi-dimensions, a center point between the first and second timing fails as an optimal memory bus timing of the first dimension.

16. The system-on-chip as recited in claim 15, wherein a number of the multi-dimensions corresponds to the number of the control registers.

17. The system-on-chip as recited in claim 15, wherein the memory timing tuner is further configured to determine multiple sets of the control register values equal to or fewer than a number of the one or more memory devices.

18. The system-on-chip as recited in claim 15, wherein the memory timing tuner is configured to determine the optimal memory bus timing of the first dimension for a first of the one or more memory devices and is further configured to:
  tune the memory bus timing margins for a second optimal memory bus timing with a second memory device; and
  average the first and second optimal memory bus timings for said implementation of the memory device controller with either the first memory device or the second memory device.

19. The system-on-chip as recited in claim 15, wherein for a second dimension after the first dimension, the memory timing tuner is further configured to:
  adjust the memory bus timing margin in a positive direction of the second dimension from the center point of the first dimension until a positive direction timing fail is determined;
  adjust the memory bust timing margin in a negative direction of the consecutive dimension from the center point of the first dimension until a negative direction timing fail is determined; and
  determine a center point between the positive direction timing fail and the negative direction timing fail as an optimal memory bus timing of the second dimension.

20. The system-on-chip as recited in claim 15, wherein at least one of the multi-dimensions corresponds to a parameter for a temperature, ASIC skew, voltage, read time, write time, or clock time.

* * * * *